UNITED STATES PATENT OFFICE.

ARTHUR W. TRENCH, OF BROOKLYN, NEW YORK, ASSIGNOR TO JOSEF GLATZ, OF SAME PLACE.

PROCESS OF RECOVERING GLYCERINE FROM SPENT SOAP-LYES.

SPECIFICATION forming part of Letters Patent No. 399,172, dated March 5, 1889.

Application filed December 1, 1888. Serial No. 292,414. (No specimens.)

*To all whom it may concern:*

Be it known that I, ARTHUR W. TRENCH, a resident of the city of Brooklyn, Kings county, New York, have invented an Improved Process of Treating Soap-Lye to Extract Glycerine and Salt, of which the following is a specification.

The object of my invention is to provide an improved process for treating spent soap-lyes and extracting glycerine and salt therefrom.

In carrying out my invention I take spent soap-lye from the soap-coppers and place it in suitable tanks. I first treat this spent soap-lye in said tanks with a small percentage of caustic lime in order to carry down as much of the fatty and resinous acids that are in suspension as possible. The lye treated as above is now allowed to settle and the clear liquor is drawn off and evaporated to salting-point—that is to say, until saturated with salt. This evaporation I prefer to take place in a vacuum-evaporator. I find good results are obtained by evaporating the lye in the evaporator described in an application for Letters Patent made by Frederick Scherr, filed December 8, 1888, Serial No. 293,015. This evaporated lye, or, in other words, "salting-point lye," is very strong in alkali. In order to kill this alkali I run the salting-point lye back into a soap-copper and mix it with tallow or other fats. This mixture of salting-point lye and fats I now boil. The mixing of this salting-point lye with the fat and the boiling, as above stated, make the lye more rich in glycerine by partially extracting the glycerine contained in the fat and neutralizes the lye, (having partially saponified the fats.) If desired, I may again treat this lye that has been mixed with tallow with lime and allow the same to settle or run through a filter-press. I now add to the lye that has been treated with tallow or other fats and boiled, as above, a solution of alum or muriate of tin, which has the effect of precipitating or carrying down the remaining fatty and resinous acids in solution in the lye. The lye, as above treated, is next filtered to remove the precipitate, preferably by passing the lye through a filter-press. The clear lye is now run into a tank, where it is treated with sufficient caustic soda or carbonate of soda to precipitate the albuminous matter contained in the lye and any remaining alum or muriate of tin from previous steps. The lye that has been treated with soda, as above, is again filtered to remove the precipitated matter, preferably by passing it through a filter-press. The clear liquor from this last filtration is next evaporated to proper density until crude glycerine is secured and salt deposited. I prefer to evaporate the liquor in a vacuum and in the apparatus invented by Frederick Scherr, before mentioned. During the course of the latter evaporation the crystallized salt that is deposited is from time to time drawn out and the same washed with the lye that has been treated, as before shown, (before being evaporated the last time,) and the lye from the salt washing which has accumulated glycerine from said salt is run into the evaporator together with fresh lye to be evaporated to secure glycerine and deposit salt, as before stated.

The crude glycerine by this process, when evaporated in Scherr's evaporator, can be obtained at a much lower temperature than in the ordinary evaporators on account of the vacuum in which it is evaporated and the peculiar arrangement of the tubes or evaporating-surfaces. Consequently the crude glycerine obtained is of a very light color, no decomposition having taken place during the process while in the vacuum, as it does in ordinary cases under high temperature.

Having now described my invention, what I claim is—

1. In the process of extracting glycerine and salt from spent soap-lye, the improvement herein described, consisting in first treating said spent lye with lime, in then settling the lime, drawing off the clear liquor and evaporating the same to salting-point, in then mixing said lye with tallow or fat, in then boiling the mixture of lye and tallow or fat, and in then adding to the lye alum or muriate of tin to precipitate and carry down fatty and resinous acids in solution in the lye, substantially as specified.

2. In the process of extracting glycerine and salt from spent soap-lye, the improvement herein described, consisting in first treating said spent lye with lime, in then settling the lime, drawing off the clear liquor and evaporating the same to salting-point, in then mixing said lye with tallow or fat, in then boiling the mixture of lye and tallow or fat, in then adding to the lye alum or muriate of tin, in then filtering the liquor, and in then adding to the clear liquor caustic soda or carbonate of soda to precipitate the albuminous matter contained in the lye and any remaining alum or muriate of tin, substantially as specified.

3. The process of extracting glycerine and salt from spent soap-lye herein described, consisting in first treating said spent lye with lime, in then settling the lime, drawing off the clear liquor and evaporating the same to salting-point, in then mixing said lye with tallow or fat, in then boiling the mixture of lye and tallow or fat, in then adding to the lye alum or muriate of tin, in then filtering the liquor, in then adding to the clear liquor caustic soda or carbonate of soda to precipitate the albuminous matter contained in the lye and any remaining alum or muriate of tin, in then filtering the liquor again, and in then evaporating the liquor to proper density to deposit glycerine and salt, substantially as specified.

ARTHUR W. TRENCH.

Witnesses:
ARTHUR V. BRIESEN,
HARRY M. TURK.